July 6, 1954 S. MILLMAN 2,683,238

MICROWAVE AMPLIFIER

Filed June 17, 1949 9 Sheets-Sheet 1

INVENTOR
S. MILLMAN
BY N. S. Ewing
ATTORNEY

INVENTOR
S. MILLMAN
BY
N. S. Ewing
ATTORNEY

July 6, 1954 S. MILLMAN 2,683,238

MICROWAVE AMPLIFIER

Filed June 17, 1949 9 Sheets-Sheet 3

INVENTOR
S. MILLMAN
BY N. S. Ewing
ATTORNEY

July 6, 1954 S. MILLMAN 2,683,238

MICROWAVE AMPLIFIER

Filed June 17, 1949 9 Sheets-Sheet 4

INVENTOR
S. MILLMAN
BY
N. D. Ewing
ATTORNEY

INVENTOR
S. MILLMAN
BY N. D. Ewing
ATTORNEY

INVENTOR
S. MILLMAN
BY
N. S. Ewing
ATTORNEY

INVENTOR
S. MILLMAN
BY N. S. Ewing
ATTORNEY

July 6, 1954 S. MILLMAN 2,683,238

MICROWAVE AMPLIFIER

Filed June 17, 1949 9 Sheets-Sheet 8

INVENTOR
S. MILLMAN

BY N. D. Ewing
ATTORNEY

INVENTOR
S. MILLMAN
BY
N. S. Ewing
ATTORNEY

UNITED STATES PATENT OFFICE 2,683,238

MICROWAVE AMPLIFIER

Sidney Millman, Brooklyn, N. Y., assignor to Bell Telephone Laboratories, Incorporated, New York, N. Y., a corporation of New York Application June 17, 1949, Serial No. 99,757

16 Claims. (Cl. 315—3)

This invention relates to high frequency amplifying devices which utilize the interaction between a stream of charged particles and a traveling electromagnetic wave to secure gain. Devices of this type are generally known as beam traveling-wave tubes, and several are disclosed in the applications of J. R. Pierce, Serial No. 640,597, filed January 11, 1946 (United States Patent 2,636,948, issued April 28, 1953), and Serial No. 704,858, filed October 22, 1946 (United States Patent 2,602,148, issued July 1, 1952).

The principal object of the present invention is to permit traveling-wave amplification to be employed at extremely short wavelengths.

A related object is to simplify the structure of traveling-wave tubes sufficiently to make tubes which are operable at extremely short wavelengths practical.

A further object is to increase the power-handling capacity of traveling-wave tubes at extremely short wavelengths.

In previously developed traveling-wave amplifiers, gain is secured from the interaction between a traveling electromagnetic wave and a stream of charged particles (e. g., electrons) which travel at substantially the same velocity as the phase velocity of the wave. To a considerable degree, the charged particles are caused to travel along in substantial synchronism with the wave, with a particular group of particles interacting with substantially the same portion of the wave at all times. At most wavelengths in the microwave region which are presently used, the structures of previously developed traveling-wave tubes are simple and rugged enough to be practical in the sizes required. At extremely short wavelengths, however, the sizes of the tubes required are so small that difficulties (e. g., construction and power dissipation difficulties) may be presented.

In accordance with a principal feature of the present invention, an electromagnetic wave is transmitted over a guiding structure in which the strength of the interacting component of the field associated with the wave is made alternately large and small at successive fixed intervals along the guiding structure and a stream of charged particles is projected in an interacting relationship with the wave at a predetermined velocity considerably lower than the phase velocity of the wave. The velocity of the stream is such that while a charged particle traverses the average distance between adjacent intervals in which the strength of the interacting component of the field is high, the wave traverses substantially the same distance plus an integral number (e. g., one) of wavelengths. A given group of charged particles interacts with successive like portions of the wave as it traverses successive intervals in which interacting field strength is high. The intervening intervals in which interacting field strength is low prevent the gain produced by such interaction from being counteracted by interaction with out-of-phase portions of the wave.

In a number of practical embodiments, the wave-guiding structure comprises a conductor containing a series of lateral slots. The slots are in the nature of resonators and serve to increase the field strength of the wave in their vicinity. Between the slots, the effect of the conductor is to reduce the strength of the interacting component of the field. The effect is to make the strength of the interacting component of the field of the traveling wave alternately large and small at successive intervals along the guiding structure. Such a structure is relatively simple and rugged, is easy to produce in the small sizes required for operation at extremely short wavelengths, and provides a relatievly large power-handling capacity because of its favorable heat-dissipative properties.

In accordance with another feature of the invention, a laterally slotted type of wave-guiding structure is provided with a number of longitudinal slots. The longitudinal slots serve to increase the space in which the charged particle stream can interact with the traveling wave and permit increased gain and power output to be secured.

A more thorough understanding of the invention will be obtained from a study of the following detailed description of several specific embodiments and the accompanying drawings which are substantially to scale. In the drawings.

Figure 1:
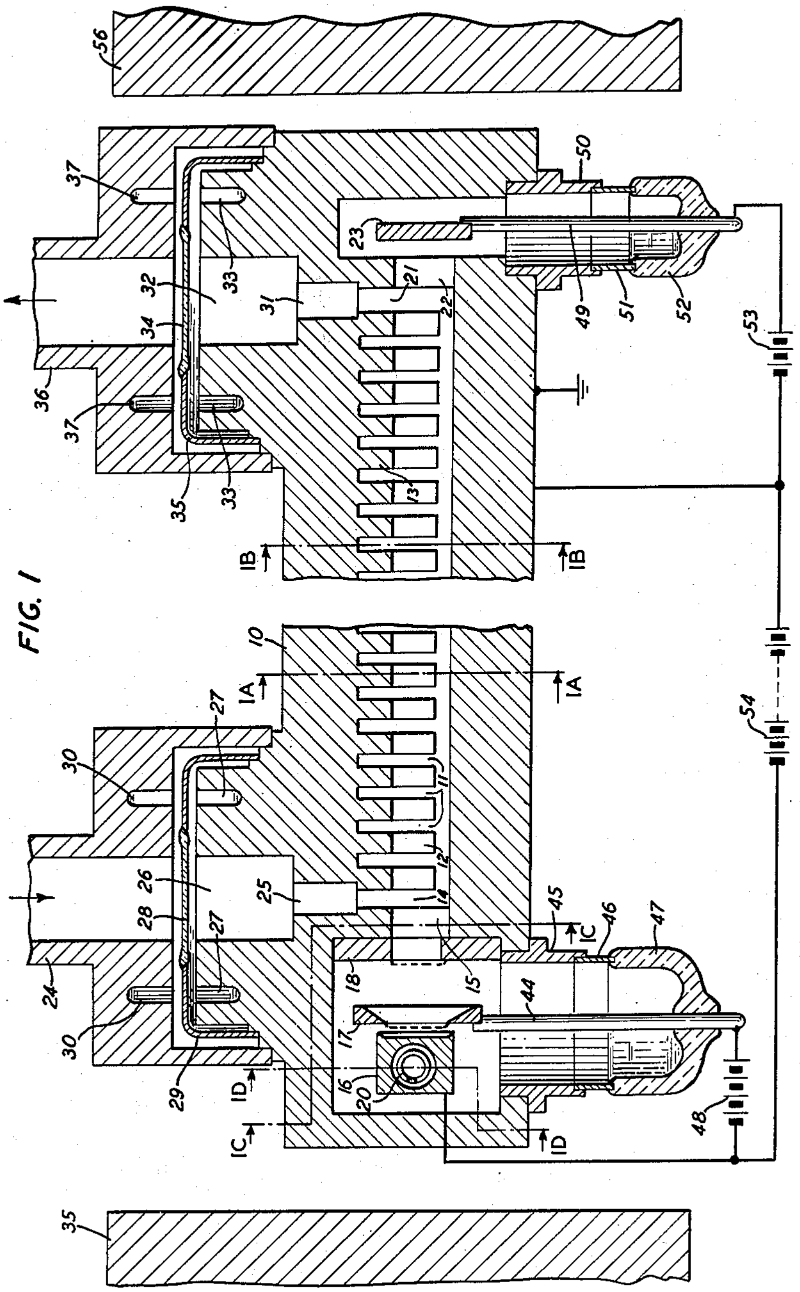
Fig. 1 represents a longitudinal cross-section of an embodiment using a series of open lateral slots in its wave-guiding structure.

Referring particularly to Fig. 1, the traveling-wave tube shown is constructed largely of non-magnetic conducting material (e. g., copper). An elongated copper block 10 forms the main portion of the tube and has an evacuated hollow interior to guide electromagnetic waves. The wave-guiding path includes a series of lateral slots 11 which are regularly spaced for most of the length of the tube. Three longitudinal slots 12 cross lateral slots 11 and extend for substantially the whole length of the tube.

Figure 1A:
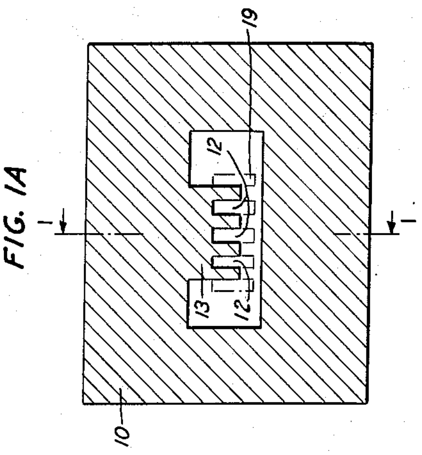
Figs. 1A, 1B, 1C and 1D are cross-sections of the structure shown in Fig. 1.
Figure 1B:
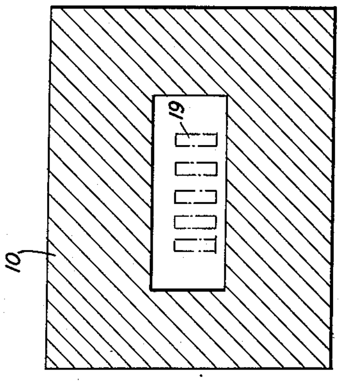

Details of the wave-guiding path are shown in the cross-sectional views of Figs. 1A and 1B. Fig. 1A is a section taken between two slots 11, along the line A—A, while Fig. 1B is a section taken through a slot 11, along the line B—B.

As shown in Fig. 1B, the cross-section of the hollow interior of the block 10 is rectangular at each slot 11, with the short dimension vertical. The cross-section of the hollow interior of the block 10 between slots 11 is much the same, as shown in Fig. 1A, except that a rectangular fin 13 extends down into the interior from the center of the top of the hollow interior. The spaces between adjacent fins 13 form the slots 11. The bottom edges of the fins 13 contain three spaced longitudinal slots 12 which extend for substantially the whole length of the tube.

Just to the left of the fin 13 farthest to the left in Fig. 1, is an end slot 14. To the left of slot 14 is a short connecting section 15, a cross-section, taken along the line C—C, being shown in Fig. 1C. The connecting section is of the same cross-section as the between-the-slot cross-section of Fig. 1A, except that the sections of the fin between longitudinal slots 12 extend to the bottom of the opening to provide a radio frequency short at the end of the wave-guiding path.

To the left of connecting section 15, block 10 has a hollow interior of rectangular cross-section to provide space for a cathode 16 and a control grid 17. An accelerator grid 18 also occupies part of the space to the left of connecting section 15, comprising a flat molybdenum plate of rectangular cross-section with a central screened rectangular aperture. The molybdenum plate is flush against the right-hand end of the open space and the aperture is aligned with passage 15 and fins 13. The aperture and the previously described end section determine the shape of an electron stream which is projected past fins 13, the shape being approximately that shown by the dotted outlines 19 in Fig. 1A.

An oxide coated nickel cathode 16 is located in the left-hand portion of the open space. Cathode 16 is rectangular in cross-section and its oxide coated surface faces to the right and is aligned with the aperture in the plate comprising accelerator grid 18. Cathode 16 has a hollow interior and contains a heating coil 20 which will be described later.

Control grid 17 is located between cathode 16 and accelerator grid 18. It comprises a thin molybdenum plate with a rectangular screened aperture which is also aligned with the aperture in the plate comprising accelerator grid 18. The manner in which both cathode 16 and control grid 17 are supported will also be described later.

Just to the right of the fin 13 farthest to the right is an end slot 21 which corresponds to slot 14 on the left. A short connecting section 22, corresponding to section 15 on the left, extends between slot 21 and a rectangular hollow portion at the right-hand end of block 10 which contains a collector electrode 23. Collector 23 is a flat rectangular molybdenum plate and is aligned with section 22 and fins 13 to intercept the electrons which are projected past fins 13. The manner in which collector 23 is supported will be described later.

Returning to the left, or input, end of the tube shown in Fig. 1, end slot 14 is connected to an input wave guide 24 by a wave-guide transformer 25. Input guide 24 is of standard rectangular cross-section and its long dimension is normal to the plane of the drawing. Transformer 25 is also of rectangular cross-section, but its transverse dimensions are smaller than those of guide 24. Transformer 25 comprises a rectangular hole, substantially a quarter of a wavelength (i. e., a quarter of a wavelength in the wave-guiding path) deep, formed in block 10 just above end slot 14. Above transformer 25 is a rectangular wave guide 26, which is of the same cross-section as the interior of wave guide 24. A short distance above the base of rectangular guide 26, block 10 terminates in a flat circular face which is raised somewhat from the rest of block 10.

An annular slot 27 opens on the flat circular face of block 10 and surrounds guide 26, serving as a radio frequency choke. The interior of block 10 is sealed off by a glass window 28, which is separated slightly from the face of block 10 and situated directly over guide 26. Window 28 is held in place by a molybdenum cup 29 which surrounds the raised portion of block 10 and is brazed to block 10 outside of choke 27.

The end of input wave guide 24 is enlarged to fit over the raised portion of block 10 and make contact with block 10 without touching molybdenum cup 29. Except for a circular flange which surrounds cup 29, guide 24 is terminated in a flat circular face which is parallel to the face of block 10 and is located just above it on the other side of glass window 28. The rectangular interior of guide 24 is aligned with guide 26 and is similarly surrounded by an annular slot 30, which serves as a radio frequency choke.

The right, or output, end of the tube is substantially identical to the input end. A wave-guide transformer 31, corresponding to transformer 25, is located just above end slot 21 and communicates with it. A rectangular wave guide 32, corresponding to guide 26, is just above transformer 31, which opens into it. As at the input end, block 10 terminates a short distance above the bottom of guide 32 in a flat circular face which is raised from the rest of block 10.

An annular slot 33, corresponding to slot 27, opens into the face and surrounds guide 32, serving as a radio frequency choke. A glass window 34, held in place by a molybdenum cup 35, is placed over the opening of guide 32, cup 35 holding window 34 slightly apart from the face of block 10. Cup 35 surrounds the raised portion of block 10 and is soldered to it outside of choke 33, sealing the interior of the tube.

An output wave guide 36, corresponding to guide 24, has an enlarged end from which an annular flange extends around the periphery of molybdenum cup 35, making contact with block 10 outside of the raised portion. Guide 36 terminates in a circular face which is parallel to the face of block 10, and the interior of guide 36 is aligned with guide 32. Output guide 36 has an annular slot 37, corresponding to slot 30, which surrounds the opening in the face of guide 36 and serves as a radio frequency choke.

Figure 1C:
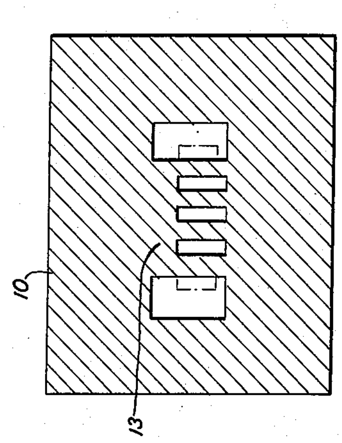
Figure 1D:
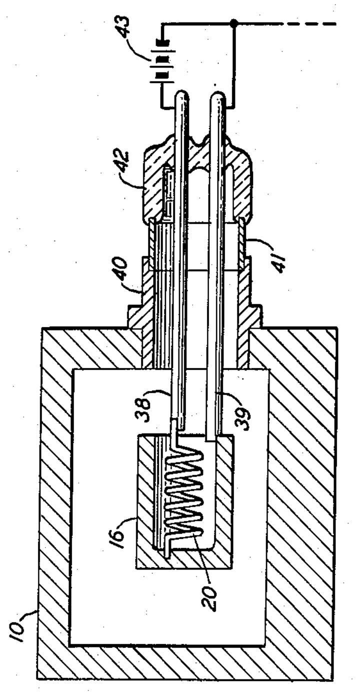

Fig. 1D shows a section of the tube taken through cathode 16, along the line D—D, illustrating the manner in which cathode 16 is supported and the manner in which it is heated. As shown, one end of heating coil 20 is embedded in cathode 16. The other end of coil 20 is attached to a tungsten rod 38. Cathode 16 is attached to another parallel tungsten rod 39, both rods extending out of the tube, to the right in Fig. 1C and out normal to the plane of the drawing in Fig. 1. A copper sleeve 40 surrounds rods 38 and 39 and fits tightly into the side wall of block 10, forming a passage out of the tube. A short molybdenum sleeve 41 is brazed to the end of sleeve 40 and a glass cap 42 is sealed to the end of sleeve 41. Rods 38 and 39 extend through the end of glass cap 42. A heater potential source 43 is connected between rods 38 and 39, causing cathode 16 to be heated and its oxide coated face to emit a stream of electrons.

As shown in Fig. 1, control grid 17 is attached to a tungsten rod 44 which extends downward out of the tube. A copper sleeve 45 fits tightly into the bottom wall of block 10 to form a passage out of the tube. A short molybdenum sleeve 46 is brazed to the end of sleeve 45 and a glass cap 47 is sealed to the end of sleeve 46. Rod 44 extends through the end of glass cap 47 and is connected to the positive terminal of a biasing battery 48, the negative terminal of which is connected to rod 39, which is shown in Fig. 1D.

It should be noted that while Fig. 1 shows a connection from the negative terminal of battery 48 passing through the left end wall of the tube, such a representation is only schematic, and is for the purpose of depicting a complete circuit. The actual connection is to the end of rod 39 as shown in Fig. 1C.

The collector electrode 23 at the right-hand end of the tube is attached to a tungsten rod 49 which extends through an opening in the bottom of block 10. A copper sleeve 50 surrounds rod 47 and fits snugly into block 10 to form a passageway out of the tube. A short molybdenum sleeve 51 is brazed to the end of sleeve 50, and a glass cap 52 is sealed to the end of molybdenum sleeve 51. Rod 47 extends through the end of glass cap 52 and is connected to the positive side of a battery 53.

The negative side of battery 54 is connected directly to copper block 10, which is also grounded. The negative side of battery 53 is also connected to the positive role of a main beam accelerating battery 54. The negative pole of battery 54 is connected to the negative terminal of battery 48. The entire tube extends lengthwise between two poles 55 and 56 of an electromagnet which supplies a longitudinal beam focusing field.

In the operation of the amplifier shown in Fig. 1, an electromagnetic wave to be amplified is supplied to the transmission path through input guide 24. As the wave of the dominant mode travels through input guide 24, it has no longitudinal electric field. The nature of the slotted wave-guiding structure is such that the wave propagates along its length with a longitudinal electric field. The slotted structure transmits the wave at a predetermined phase velocity which may be, for example, one-third the velocity of light for certain slot proportions and wave frequencies. An electron beam is projected lengthwise past the slotted structure at a predetermined lower velocity and interacts with the longitudinal electric field of the wave in the manner to be described below, causing the wave to grow in amplitude as it progresses to the right. The amplified wave is taken off through output guide 36, with no longitudinal electric field.

Figure 5:
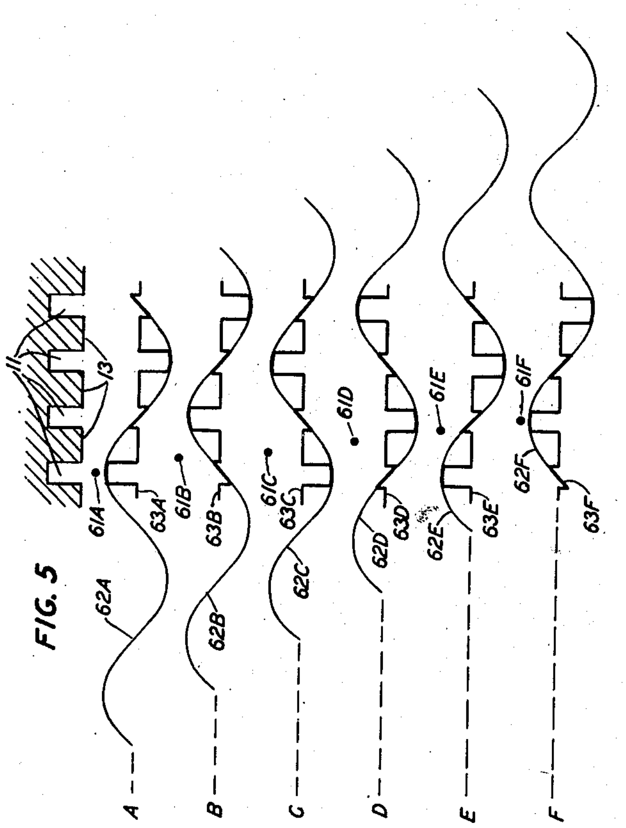
Fig. 5 shows a schematic representation of the relative positions of an electron and a wave at various time intervals in an amplifier in accordance with an embodiment of the invention.

Fig. 5 shows substantially a moving picture of the traveling electromagnetic wave and a single moving electron as they progress along the transmission path. Reference numeral 61 indicates a single electron and reference numeral 62 indicates a plot of the longitudinal electric vector of the electromagnetic wave against distance. Reference numeral 63 indicates a plot against distance of the longitudinal electric vector just at the edges of the fins 13, where boundary conditions exist. The letters A through F indicate what may be considered instantaneous views of the various quantities at successive time intervals. Although Fig. 5 shows an integral relation between wavelength and slot spacing, such a relation is not essential and is adopted only for convenience of illustration.

At position A in Fig. 5, electron 61 "sees" a relatively large longitudinal electric field component of the wave. The electron 61 is passing a slot 11, and the presence of the slot allows a large longitudinal component of the electric field to exist. Slot 11 may, from one point of view, be considered as a resonator which increases the longitudinal electric field component in its vicinity.

Position B indicates conditions after the wave has progressed a quarter of a wavelength beyond the first slot 11. Electron 61 is now close to metal, and the longitudinal field in its vicinity is decreased to zero. No interaction can, therefore, take place.

Position C indicates conditions after the wave has progressed half a wavelength. Electron 61 is still close to metal and has no longitudinal electric field with which to interact. If a longitudinal electric field component were allowed to exist, it can readily be seen that the electron 61 would "see" a field opposite in phase from that which it "saw" at position A. Interaction would oppose and counteract any gain obtained from the interaction obtained at position A.

Positions D and E indicate, respectively, conditions after the wave has progressed three-quarters of a wavelength and a full wavelength. In both instances, electron 61 has not yet traversed the distance between slots 11 and is still close to metal. The longitudinal electric field is zero in the vicinity of electron 61 and no interaction takes place.

Position F indicates conditions under which further interaction is allowed to take place. The wave has progressed a distance of one wavelength plus the distance between the centers of two adjacent slots 11, while the electron 61 has progressed from one slot to another. Electron 61 now "sees" a longitudinal electric field substantially like that which it "saw" at position A. The interaction that now takes place supplements that which occurred at position A and further gain results.

Summarizing, electron 61 interacts only with successive like portions of the wave. The electron 61, in effect, falls behind the wave a distance of one wavelength each time it travels between two slots 11. The immediate presence of the conducting fin 13 prevents interaction with out-of-phase portions of the wave from counteracting gain already secured.

If electron 61 were to travel along in substantial synchronism with the wave, the wave would necessarily have to travel at a velocity obtainable by electrons at feasible accelerating voltages. Such velocities are generally of the order of magnitude of about a tenth of the velocity of light or less. However, at extremely short wavelengths, such a velocity of wave transmission would require the slots 11 to be so small and so close together that the structure would probably be commercially impracticable, both from a mechanical and a power-handling standpoint. The present invention permits a relatively high velocity of wave transmission to be employed along with normal beam velocities. The slots, therefore, can be larger and farther apart, and the above-mentioned difficulties are obviated. The structure is, therefore, well adapted for construction for operation at wavelengths as short as six millimeters or less.

It should be borne in mind that the process illustrated in Fig. 5 is continuous and that many electrons are involved. It should also be remembered that the analysis is strictly accurate only when the boundary conditions just off the metal fins 13 obtain. In general, electrons traveling farther away from the fins 13 interact somewhat with out-of-phase field components and are thereby less effective in producing gain. For simplicity, however, the boundary conditions will be considered to exist in the analyses which follow.

In obtaining a thorough understanding of the invention, it is helpful to consider the relationship between electron and field from a mathematical standpoint. The following mathematical analysis applies when the above-mentioned boundary conditions exist.

The array of slots 11 shown in Figs. 1 and 5 may be considered to be a filter-type repetitive structure. Assume that there is set up in the circuit a traveling electromagnetic wave moving lengthwise of the tube (i. e., in the $z$ direction) with a phase velocity $v$. Let $\beta$ be the phase displacement between the centers of adjacent slots separated by a distance $d$, so that $$\beta = 2\Pi \frac{d}{\lambda} \qquad (1)$$

where $\lambda$ is the wavelength in the transmission structure at the frequency of operation. The time taken for the wave to move a distance $d$ is $$\frac{\beta}{2\Pi} T$$

where T is the period of oscillation of the wave. Therefore $$v = \frac{d}{\beta T} 2\Pi = \frac{\omega d}{\beta} \qquad (2)$$

where $\omega$ is equal to $2\pi$ times the frequency of wave oscillation.

In a conventional traveling-wave tube in which the electrons interact directly with the wave, the electron velocity would have to be approximately equal to $v$. The time taken for an electron to move from one slot to an adjacent slot would have to be $$\frac{\beta}{\omega}$$

or the same as that taken for the wave to travel the same distance.

In accordance with a principal feature of the present invention, the electron speed is considerably slower than this wave velocity, and the time required for an electron to move a distance $d$ is $$\frac{\beta}{\omega} + T$$

or the same time that is required for the wave to advance a distance equal to $d + \lambda$.

Assuming now that a peak in the electromagnetic wave at a slot is the optimum condition for some type of interaction between the electrons and the wave, such as would be the case when the peak represents the maximum retarding force on a bunched electron beam, synchronism is maintained by having a peak of the electromagnetic wave at a slot whenever the bunched electrons pass the slot. The electron speed required for this synchronism is $$v_e = \frac{d}{\frac{\beta}{\omega} + T} = \frac{\omega d}{\beta + 2\Pi} \qquad (3)$$

instead of $$\omega \frac{d}{\beta}$$

for the case when the electrons are in synchronism with what might be called the fundamental of the wave. The required electron speed is thus reduced by the factor $$\left( \frac{\beta + 2\Pi}{\beta} \right)$$

and the voltage by the square of this factor. Adverse interaction between the bunched electrons and the wave, during the part of the cycle for which the phase is exactly wrong, is minimized by having the electrons at that part of the cycle close to the metal walls where the axial component of the electric field vanishes.

An equivalent analytical expression of the above may be obtained by representing the axial component of the electric field of the traveling wave by the relation $$E_z = F(z) e^{j\omega t} \qquad (4)$$

where $$F(z) = \sum_{n=0}^{n=\infty} A_n e^{-j(2\Pi n + \beta)\frac{z}{d}} \qquad (5)$$

Assuming the amplitude of $E_z$ to be constant at the mouth of the slots, and denoting it by $E_0$, $$A_n = \frac{E_0}{d} \int_{-\frac{w}{2}}^{+\frac{w}{2}} e^{j(2\Pi n + \beta)\frac{z}{d}} dz = \frac{2E_0}{2\Pi n + \beta} \sin\left[ (2\Pi n + \beta) \frac{w}{2d} \right] \qquad (6)$$

where $w$ is the width of the slot.

Combining (4), (5), and (6) gives $$E_z = E_0 \sum_{n=0}^{n=\infty} \frac{2 \sin \left[ (2\Pi n+\beta)\frac{w}{2d} \right]}{2\Pi n+\beta} e^{j\left[\omega t-(2\Pi n+\beta)\frac{z}{d}\right]} \quad (7)$$

Thus $E_z$ is represented as a sum of Fourier component traveling waves with different phase velocities. The component wave corresponding to $n=1$ may be termed the first spatial harmonic, and is given by $$E_{z1} = E_0 \frac{2 \sin \left[ (2\Pi+\beta)\frac{w}{2d} \right]}{2\Pi+\beta} e^{j\left[\omega t-(2\Pi+\beta)\frac{z}{d}\right]} \quad (8)$$

This represents a wave moving in the direction of increasing $z$ with a phase velocity $$\frac{\omega d}{2\Pi+\beta}$$

which is the same as that given in Equation 3.

Thus, in the traveling-wave tube described in connection with Figs. 1 and 5, the electrons may be said to interact with the first Fourier spatial harmonic of the electromagnetic wave.

It should be pointed out that the spatial harmonic concept is for purposes of mathematical description only, and that the harmonics have no independent physical existence. A spatial harmonic is to be sharply distinguished from the usual frequency harmonic, in that the concept applies only in the case of traveling waves. The various spatial harmonics may be considered as being waves of the same frequency but of different wavelengths and phase velocities. A complex traveling wave, such as that indicated by reference numeral 63 in Fig. 5, may be completely described in mathematical terms by a series of such waves.

From Equation 7 it can be seen that gain-producing interaction may be obtained if the electron stream is synchronized with any Fourier spatial harmonic of the traveling wave. For such interaction to take place, the electron velocity should be substantially equal to $$\frac{\omega d}{2\Pi n+\beta}$$

where $n$ is the number of the order of the harmonic with which the stream is to interact. This may be restated in mathematical terms by combining Equations 2 and 3 and including $n$ as a factor in the $2\pi$ term to provide for interaction, if desired, with spatial harmonics above the first. An expression obtained in this manner is $$\omega d\left(1-\frac{v_e}{v}\right)=2\Pi n v_e$$

An actual model of the tube shown in Fig. 1 was constructed for operation in the 1.25-centimeter wavelength region. The wave transmission path contains eighty slots 11, approximately nine-tenths of a quarter of a free-space wavelength, or .112 inch, in depth, and spaced .042 inch between slot centers. The ratio of slot width to the distance between centers $$\frac{w}{d} \text{ is } 0.3$$

and is based on maximizing the electron interaction with the first spatial harmonic.

Three axial slots 12, .021 inch wide, are cut through all of the copper fins 13 to about half the depth of the quarter wave transverse slots 11 in order to increase the interaction space in which there is an appreciable axial component of the electric field.

The lateral slots 11 are .013 inch in width. Referring to Fig. 1A, each copper fin 13 extends downward for a distance of .112 inch. The distance between the bottom of fin 13 and block 10 is .020 inch. The lateral width of fin 13 is .120 inch and the total width of the hollow interior of block 10 is .335 inch.

The input and output wave guides 24 and 36 are standard 1.25-centimeter guides, with an interior measuring .170 inch by .420 inch. No iron alloy is used in metal-to-glass seals or in other parts of the tube, thereby facilitating the application of a uniform magnetic focusing field parallel to the axis of the tube.

The fact that the electrons move in narrow slots makes it necessary to design the electron gun with considerable care. Both the control grid 17 and the accelerating grid 18 are wound with closely spaced tungsten wire on molybdenum frames. In the accelerating grid 18, .001 inch diameter wire is spaced .007 inch between centers and, in the control grid 17, the wire is .005 inch in diameter and the spacing is .004 inch. The two grids are about .150 inch apart and the distance between the control grid 17 and the planar cathode surface is about .030 inch. When the control grid 17 is kept about 100 volts positive with respect to cathode 16, by means of battery 48, the electric field is approximately the same on both sides of the grid for the cathode emission densities used (about 0.2 ampere per square centimeter).

The active area of cathode 16 is a rectangle of dimensions large enough to flood the interaction region. Optionally, the active area of cathode 16 may be shaped to correspond to the desired cross-section of the electron stream. With the arrangement used, about half of the electrons passing the control grid 17 are intercepted by the accelerating grid 18 and the first copper fin 13. In the operation of the tube, about eighty per cent of the electrons entering the interaction space reach collector plate 23. By means of battery 53, the latter is kept about 40 volts positive with respect to the body of the tube to prevent secondary electrons from leaving the collector 23 and giving an inaccurate measure of the fraction of electrons that pass the interaction space and that are not deflected to the walls.

With main battery 54 providing a beam potential of 1220 volts, and with about a 1000 gauss focusing field, the tube gives a net gain up to 9 decibels for a 4-milliampere beam current. More gain could be obtained by increasing the length of the tube. A band width of about three per cent is obtained.

The design of the wave transmission structure of Fig. 1 is considerably facilitated if an approximate lumped constant equivalent of the electromagnetic circuit is set up. For a given set of circuit constants the following quantities can be calculated:

(1) $\beta$, the phase displacement per section, from which the operating voltage and its frequency dependence can be determined; and (2) $Z_0$, the required terminating impedance for this filter type structure, which can be used in the design of the input and output sections.

Figure 6:
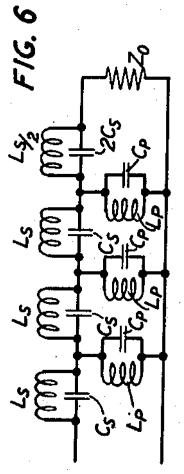
Fig. 6 shows an equivalent circuit of the wave-guiding structure of the tube of Fig. 1.

An appropriate equivalent circuit is given in Fig. 6, omitting radio frequency losses. The circuit constants associated with each of the slots are denoted by $L_s$ and $C_s$, while the corresponding constants for the shunt impedances are denoted by $L_p$ and $C_p$. The phase displacement per section is obtained from the relation $$\cos \beta = 1 + \frac{Z_s}{2Z_p} = 1 + \frac{C_p}{2C_s} \frac{\omega_p^2 - \omega^2}{\omega_s^2 - \omega^2} = 1 - \frac{1}{2} \frac{C_s}{C_p} \frac{r^2 - \frac{\omega_p^2}{\omega_s^2}}{1 - r^2} \quad (9)$$

where $$\omega_s^2 = \frac{1}{L_s C_s}, \ \omega_p^2 = \frac{1}{L_p C_p}, \text{ and } r = \frac{\omega}{\omega_s} \quad (10)$$

Figure 7:
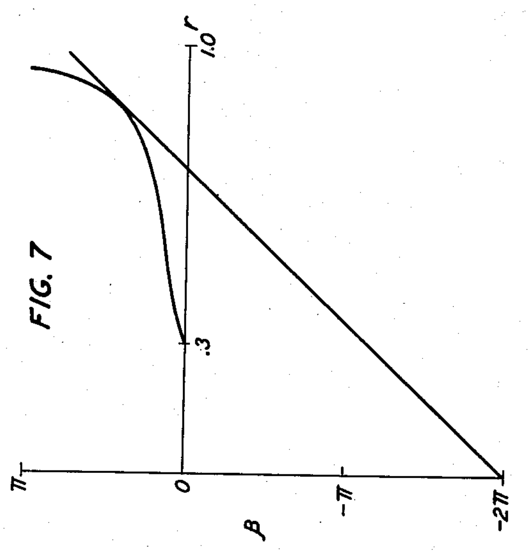
Fig. 7 is a design curve which arises in connection with Fig. 6.

A plot of $\beta$ as a function of $r$ is shown in Fig. 7 for the values $$\frac{C_p}{C_s} = 0.6$$

and $$\frac{\omega_p}{\omega_s} = 0.3$$

There parameters correspond very closely to those used in the amplifier described in connection with Fig. 1.

In order to have the operation of the amplifier independent of frequency, at least to a first order, the frequency of the midband should be chosen at a point where the tangent to the curve shown in Fig. 7 intercepts the $\beta$ axis at a value $\beta = -2\pi$. For interaction with other harmonics, the intercept will be, in general, $\beta = -2\pi n$. Since the phase velocity of the first spatial harmonic is given by $$\frac{\omega d}{\beta + 2\Pi}$$

a fractional change in the phase constant at this point is compensated by an equal fractional change in frequency, i. e., $$\frac{\delta\beta}{\beta + 2\Pi} = \frac{\delta r}{r} = \frac{\delta f}{f} \quad (11)$$

leaving the phase velocity unchanged.

It follows from Equations 11 and 1 that $$\frac{df}{d\left(\frac{1}{\lambda}\right)} = 2\Pi d \frac{f}{\beta + 2\Pi} = \frac{\omega d}{\beta + 2\Pi} \quad (12)$$

Now $$\frac{df}{d\left(\frac{1}{\lambda}\right)}$$

is the expression for the group velocity of a wave, and $$\frac{\omega d}{\beta + 2\Pi}$$

is the phase velocity of the first spatial harmonic of the wave. It follows from Equation 12 that for the indicated region of operation of the amplifier of Fig. 1, the phase velocity of the Fourier component wave with which the electrons are interacting is the same as the group velocity of the wave.

Figure 8:
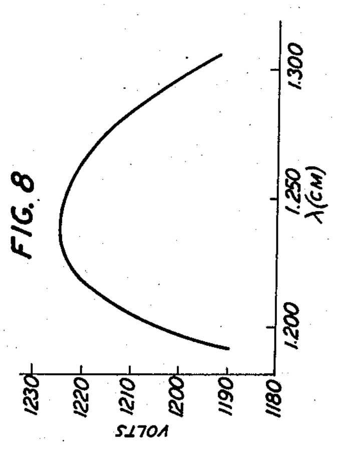
Fig. 8 is a curve showing beam voltage plotted against operating wavelength for a model of the embodiment of the invention shown in Fig. 1.

The variation of optimum beam voltage with wavelength for the constructed model of the tube shown in Fig. 1 is illustrated in Fig. 8. The solid curve indicates the calculated or predicted behavior. Experimental results indicate a behavior very closely resembling the predictions of the curve.

Figure 1E:
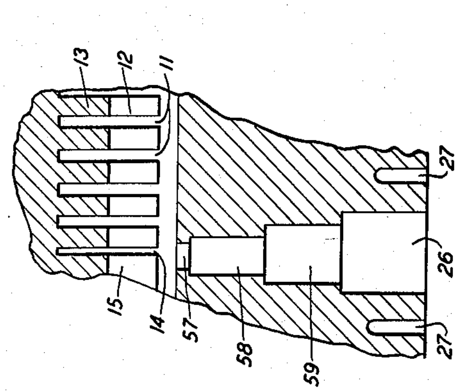
Fig. 1E shows an alternate input circuit for the tube shown in Fig. 1.

An alternative input circuit for the tube shown in Fig. 1 is illustrated in Fig. 1E. The end slot 14 is only half the width of the other slots 11 (i. e., .0065 inch instead of .013 inch wide), and the signal is applied from the bottom, rather than the top, of the tube. The center of the transformer system is displaced to the left from the center of end slot 14 by about .013 inch, and a rectangular hole 57, about .025 inch deep, connects the interior of the tube to the transformer system. In an actual model, the dimensions of the rectangular cross-section of hole 57 are approximately .049 inch by .335 inch.

The matching transformer is made up of two quarter wave sections 58 and 59. Section 58 is about .170 inch long and .067 inch by .355 inch in cross-section, and is opened into by connecting hole 57. Section 58 in turn opens into section 59, which is about .155 inch in length and .125 inch by .396 inch in cross-section. Section 59 opens into guide 26, which has been described in connection with Fig. 1.

A similar arrangement may, if desired, be used as an output circuit as an alternative to that shown in Fig. 1. In all cases, component parts such as tungsten rods 44 and 49 are rearranged to extend out of the tube in mechanically non-interfering directions.

From one point of view, the slotted structure of Fig. 1 may be considered to comprise an electromagnetic wave transmission path with means (i. e., the resonators or slots 11) for increasing the axial electric field at regular intervals along the tube. From a second point of view, the structure may be said to comprise a transmission path with means (i. e., the fins 13) for decreasing the axial electric field at regular intervals along the tube. From a third point of view, the structure may be considered as a transmission path in which fins 13 and slots 11 comprise means for alternately decreasing and increasing the axial electric field at successive intervals along the path.

From still another standpoint, the wave-guiding structure may be considered as a corrugated structure comprising regularly spaced sections having alternately different surge impedances. For example, the hollow interior of block 10 may be considered to be a wave guide comprising regularly spaced sections. The sections at each slot 11 may be considered to have a high surge impedance, while the sections at each fin 13 may be considered to have a low surge impedance.

From a still further point of view the structure may be considered as being made up of sections which produce alternately different relationships between the electric and magnetic field components of an electromagnetic wave traveling through the guide. As before, the different sections may be considered as being those at slots 11 and fins 13, respectively.

The electron stream is projected along the path at a velocity less than the velocity at which the wave which is to be amplified progresses along the path. An electron travels the average distance between adjacent like intervals in the time that it takes the wave to traverse the same distance plus an integral number of wavelengths, usually one. As has been previously pointed out, interaction takes place largely as the electron passes those intervals where the strength of the wave has been increased. Interaction as the electron passes those intervals where the strength of the wave is reduced is relatively small, and therefore does not appreciably counteract gain secured by interaction at the other intervals along the path.

Figure 2:
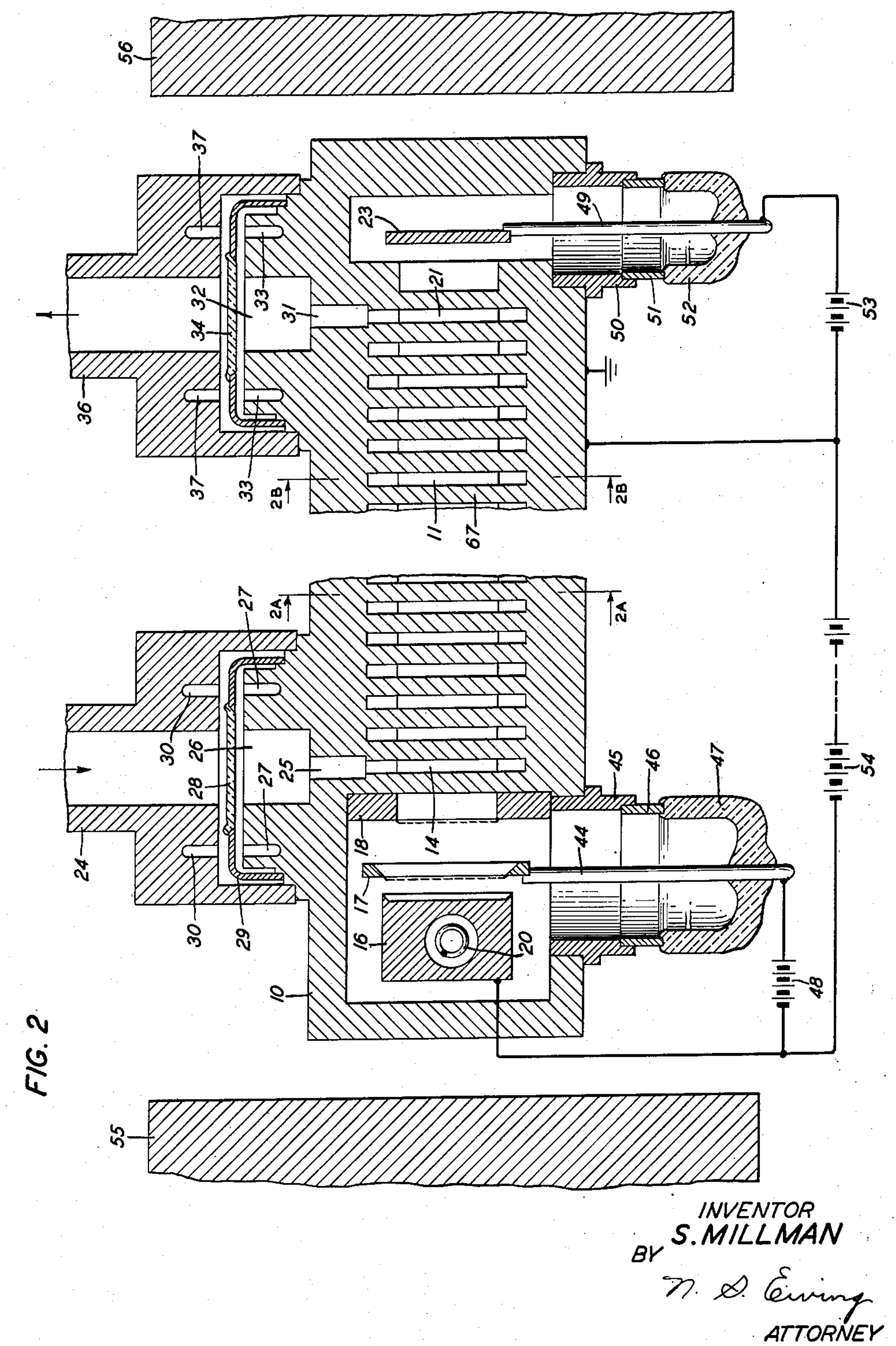
Fig. 2 illustrates a longitudinal cross-section of an embodiment of the invention in which a series of single slots, closed at each end, are used.

Fig. 2 shows a modification of the traveling-wave amplifier described in connection with Fig. 1. Except for details of the wave-guiding path, the structure of the tube shown in Fig. 2 is substantially the same as that of the tube shown in Fig. 1. Similar component parts have been given like reference numerals and will not be redescribed.

Figure 2A:
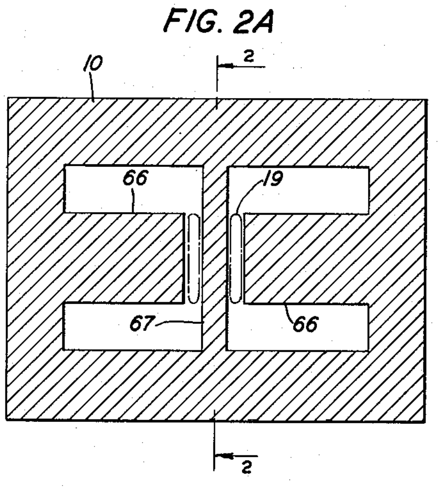
Figs. 2A and 2B are cross-sections of the structure shown in Fig. 2.
Figure 2B:
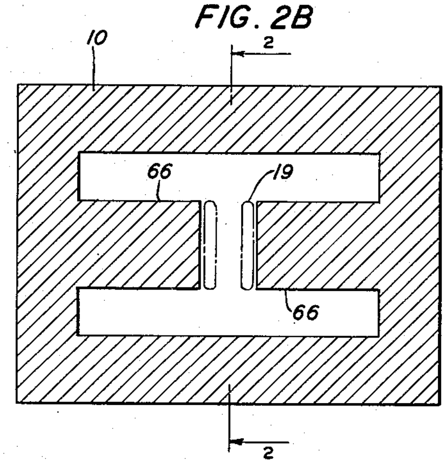

Details of the wave-guiding path are shown in the cross-sectional views of Figs. 2A and 2B. Fig. 2A is a section taken between two slots 11, along the line A—A, while Fig. 2B is a section taken through a slot 11, along the line B—B.

As shown in Fig. 2B, the cross-section of the hollow interior of block 10 at a slot 11 is in the shape of an H lying on one side. The electron stream passes through part of the space corresponding to the cross-arm of the H, indicated by dotted outlines 19 in Figs. 2A and 2B. A solid rectangular portion 66 of block 10 extends inwardly on each side of the hollow interior to give the path suitable transmission characteristics, and gives the interior its H-like shape.

Fig. 2A shows the cross-section of block 10 between slots 11. A flat rod-like piece of copper 67 extends vertically through the center of the opening described in connection with Fig. 2B. The actual slots 11 are the spaces between adjacent rod-like elements 67. The slots 11, defined by rod-like elements 67, are twice as long as the slots 11 of the tube shown in Fig. 1, and are closed at both ends. In an actual model, they would be approximately .44 wavelength long instead of .22 wavelength.

This modification of the traveling-wave tube of Fig. 1 eliminates the three axial slots 12, and makes the circuit somewhat easier to construct. The gain is about the same as for the tube shown in Fig. 1, but the power output is reduced to about half.

The operation of the amplifier of Fig. 2 is substantially the some as that of the tube described in connection with Fig 1. The shape of the electron stream is that indicated by the dotted outline 19 in Figs. 2A and 2B, the first rod-like element 67 intercepting part and causing the beam to proceed in two sections, one on either side of each element 67.

Figure 3:
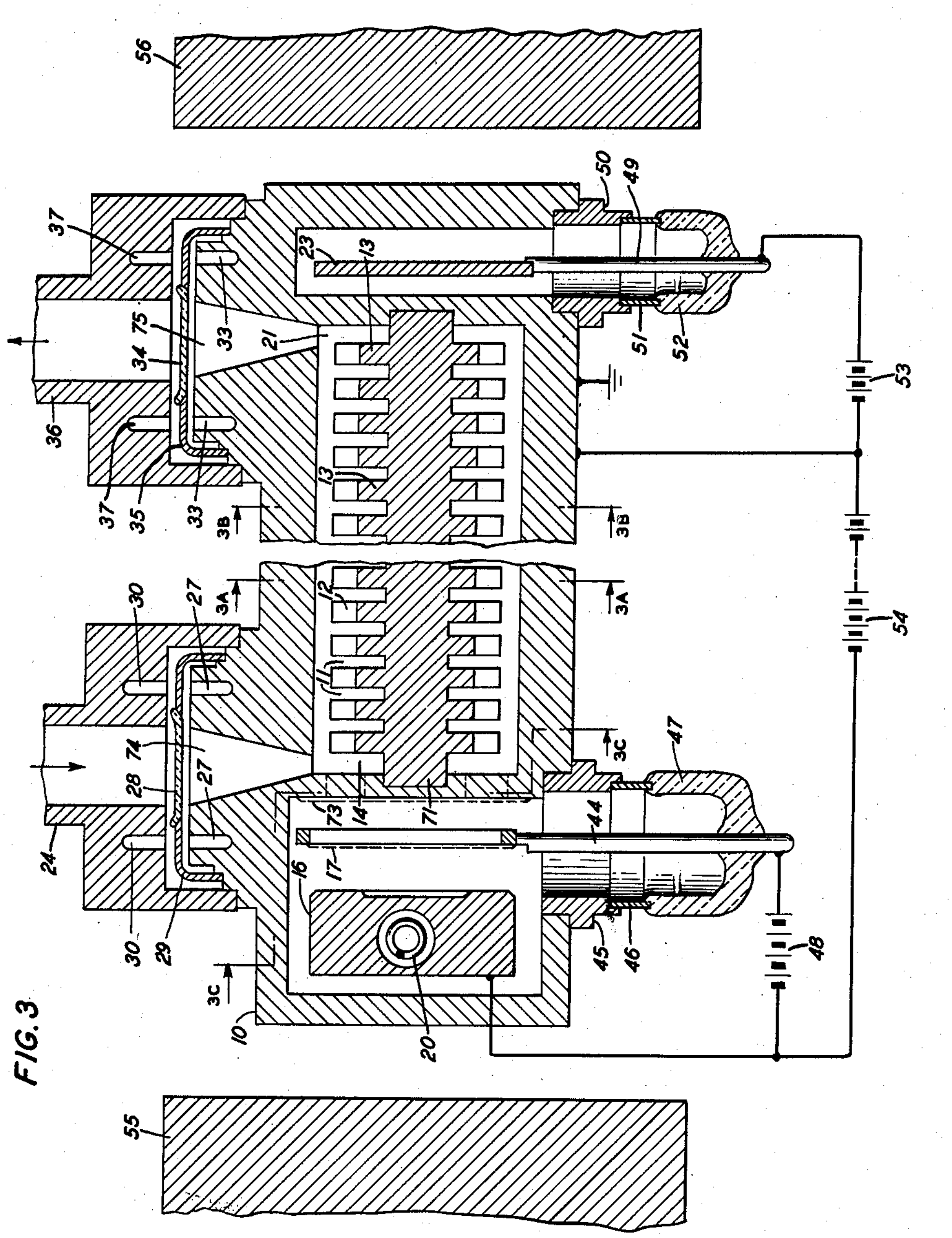
Fig. 3 shows a longitudinal cross-section of an embodiment using a disc-loaded rod as an integral part of its wave-guiding structure.

Fig. 3 shows another modification of the traveling-wave amplifier described in connection with Fig. 1. As in the case of Fig. 2, the structure of the tube shown in Fig. 3 is substantially the same as that of the tube of Fig. 1. Similar component parts have been given similar reference numerals and will not be redescribed.

Figure 3A:
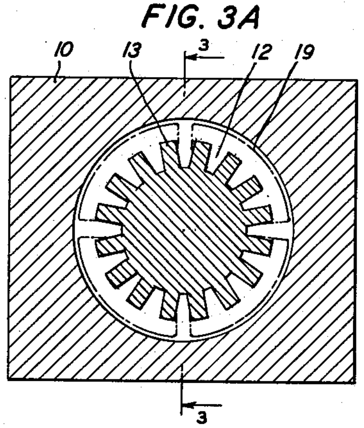
Figs. 3A, 3B and 3C are cross-sections of the structure shown in Fig. 3.
Figure 3B:
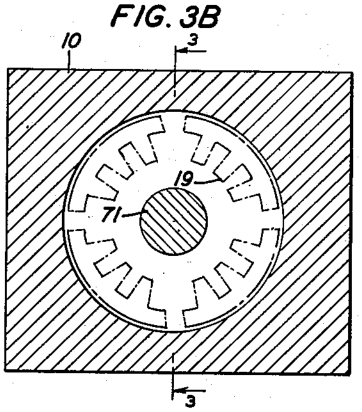

Details of the wave-guiding path are shown in the cross-sectional views of Figs. 3A and 3B. Fig. 3A is a cross-sectional view taken between two slots 11, along the line A—A, and Fig. 3B is a section taken through a slot 11, along the line B—B.

In Fig 3, the copper block 10 has a hollow interior of circular cross-section. Along the axis of the hollow interior is a copper rod 71, in which a series of circumferential slots 11 are cut. Slots 11 may number eighty or more and are about .22 wavelength deep and about one-fortieth of a wavelength wide. A number of radial slots 12 are cut in the fins or discs 13 formed between slots 11 to provide additional space for the electrons to interact with the electromagnetic wave of the circuit. Radial slots 12 are about half the depth of slots 11.

Figure 3C:
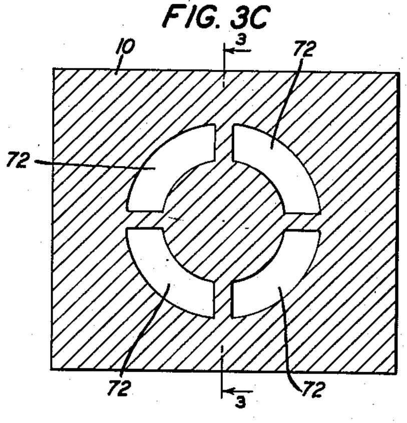

Rod 71 is brazed into the shell at either end of the hollow interior of block 10. For this purpose, end sections are located just beyond both end slots 14 and 21. A cross-section of the end section to the left of end slot 14 is shown in Fig. 3C, taken along the line C—C in Fig. 3. A number of spaces 72 are cut into the end section to permit a substantially cylindrical hollow electron beam to travel along the periphery of the fins or discs 13 as well as in the radial slots 12. The spaces 72 in the end section are, therefore, aligned with the space in which interaction is to take place. The end section to the right of end slot 21 is substantially the same.

In Fig. 3, the cathode 16 has an electron-emissive face shaped to emit a hollow cylindrical electron beam to the right. It is aligned with the openings 72 in the end sections which hold rod 71 in place. The collector 23 is circular to receive the electron beam at the end of the path. An accelerating grid 73, corresponding to grid 18 in Fig. 1 covers the openings 72 in the end section to the left of end slot 14 to aid in guiding the electrons in straight line paths.

The means for supplying the input wave to end slot 14 and for withdrawing the amplified wave from end slot 21 is somewhat different in the amplifier of Fig. 3, and is shown as an alternative to that used in the Fig. 1 tube. A tapered wave guide 74 corresponds to transformer 25 and guide 26 at the input end of the tube, and a tapered wave guide 75 corresponds to transformer 31 and guide 32 at the output end. The narrow ends of guides 74 and 75 open into end slots 14 and 21 respectively, and have dimensions chosen to give a good impedance match to the wave transmission circuit. The wide ends of guides 74 and 75 have the same dimensions as input and output guides 24 and 36, respectively.

The operation of the traveling-wave tube shown in Fig. 3 is substantially the same as the operation of the Fig. 1 tube. The outline of the electron stream is that shown by the dotted outlines 19 in Figs. 3A and 3B, fins 13 intercepting segments of the initial stream. Electrons travel within the radial slots 12 and between the fins 13 and the inner wall of block 10 to interact with the traveling electromagnetic wave.

Figure 4:
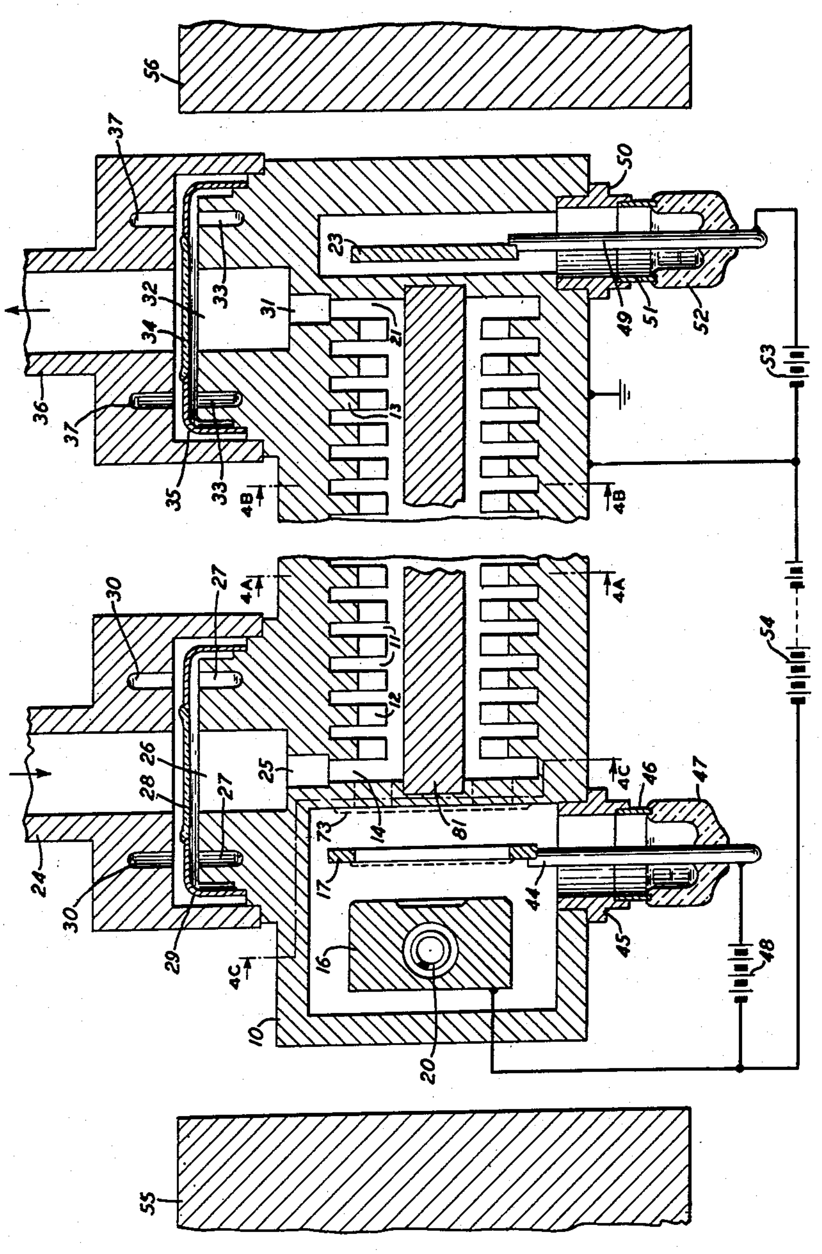
Fig. 4 represents a longitudinal cross-section of an embodiment of the invention in which a series of apertured discs are used in the wave-guiding structure.

Still another modification of the Fig. 1 amplifier is shown in Fig. 4. As with previous figures, the tube of Fig. 4 is substantially the same as that of Fig. 1 except for the waveguiding structure. Like parts have been given like reference numerals and will not be described again.

Figure 4A:
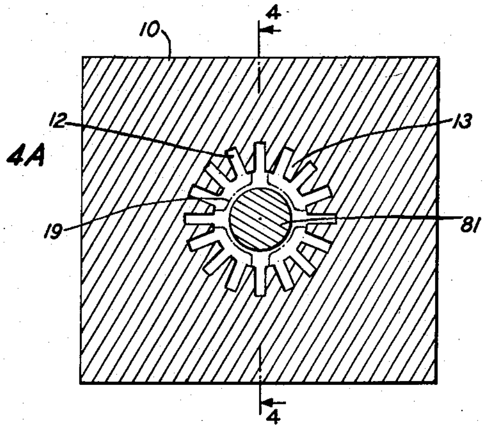
Figs. 4A, 4B and 4C are cross-sections of the structure shown in Fig. 4.
Figure 4B:
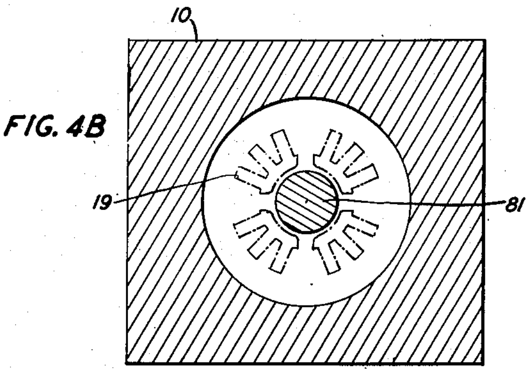

The wave-guiding structure shown in Fig. 4 is substantially the inverse of that shown in Fig. 3. Details are shown in the cross-sectional views of Figs. 4A and 4B. Fig. 4A is a section taken between two slots 11, along the line A—A, and Fig. 4B is a section taken through a slot 11, along the line B—B.

In Fig. 4, the wave-guiding structure comprises an array of apertured discs or circular fins 13 mounted within the hollow interior of the tube, with a copper center rod 81 passing through the apertures. The discs are brazed to the inside of the hollow block 10 and are spaced regularly along the tube. The apertures of discs 13 are circular in shape and are in alignment along the axis of the tube. As indicated in Fig. 4A, a number of radial slots 12 are cut into the discs or fins 13 around the periphery of the apertures and extend for substantially the whole length of the wave-guiding path.

In the tube shown in Fig. 4, there may be, for example, eighty or more discs 13. The slots 11 between discs 13 are about .22 wavelength deep and about one-fortieth of a wavelength wide. The depth chiefly determines the frequency at which the greatest amplification occurs. The radial slots 12 are of about half the depth of the lateral slots 11.

Figure 4C:
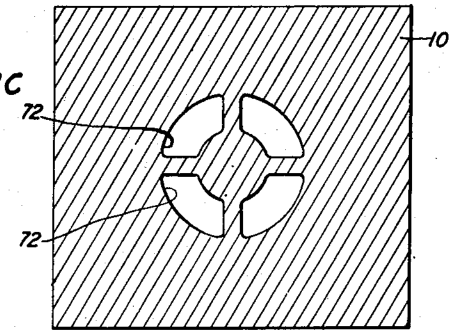

A copper center-rod 81 is mounted along the axis of the tube in the same manner as rod 71 in Fig. 3, and provides coupling between adjacent slots 11. The degree of coupling can be regulated by the space between the rod 81 and the discs 13. Fig. 4C, a section taken along the line C—C, shows the end section to the left of end slot 14 which supports rod 81. As with the end section in Fig. 3, shown in Fig. 3C, several spaces 72 are aligned with the space between rod 81 and discs 13 to allow the electron beam to travel along the wave-guiding path. An accelerating grid 73 closes the openings 72 on the side of the end section facing toward cathode 16. The end section to the right of end slot 21 is somewhat similar, and collector 23 is so shaped as to intercept the beam at the end of the path.

As in previous figures, the approximate shape of the electron stream is indicated by the dotted outlines 19 in Figs. 4A and 4B. Portions of the original beam are intercepted by the slotted discs 13. The remaining electrons travel along radial slots 12 and in the space between discs 13 and rod 81 to interact with the traveling electromagnetic wave.

It is to be understood that the above-described arrangements are illustrative of the application of the principles of the invention. Numerous other embodiments may be devised by those skilled in the art without departing from the spirit and scope of the invention.

What is claimed is:

1. A broad-band microwave amplifier which comprises an elongated conductively bounded electromagnetic wave guiding passage characterized by a mid-band operating phase velocity of wave transmission $v$ and having at least one transversely corrugated inner surface, the corrugations of said surface forming a succession of substantially uniform parallel slots and ribs in alternation, whereby said passage comprises enlarged and constricted wave guiding passage portions in alternation, said slots being of substantially constant width and spacing in the longitudinal direction and the centers of adjacent slots and ribs in alternation, whereby said passage comprises enlarged and constricted wave guiding passage portions in alternation, being separated in the longitudinal direction by a distance $d$, means to supply signal wave energy within a predetermined frequency band to one end of said wave guiding passage, means to withdraw amplified signal wave energy from the other end of said wave guiding passage, and means including an electron gun to direct a stream of electrons longitudinally through said wave guiding passage in close proximity to said corrugated surface in the direction of signal wave propagation at an average velocity $v_e$, the quantities $v$, $d$, and $v_e$ being related substantially by the expression $$\omega d\left(1-\frac{v_e}{v}\right)=2\pi n v_e$$

where $\omega$ is a mid-band radian signal frequency and $n$ is a positive integer, and the ratio of slot width in the longitudinal direction to the distance $d$ being at most three-tenths.

2. A microwave amplifier in accordance with claim 1 in which at least one longitudinal electron-carrying slot extends lengthwise of said corrugated surface, crossing said transverse corrugations substantially at right angles and positioned to encompass at least a portion of the electron stream, to increase the space in which gain-producing interaction between the signal waves and the electron stream can take place.

3. A broad-band microwave amplifier which comprises an elongated conductively bounded electromagnetic wave guiding passage characterized by a mid-band operating phase velocity of wave transmission v and having at least one transversely slotted inner surface, whereby said passage comprises enlarged and constricted wave guiding passage portions in alternation, the slots having substantially constant width and spacing in the longitudinal direction and the centers of adjacent slots being separated in the longitudinal direction by a distance $d$, means to supply signal wave energy within a predetermined frequency band to one end of said wave guiding passage, means to withdraw amplified signal wave energy from the other end of said wave guiding passage, and means including an electron gun to direct a stream of electrons longitudinally through said wave guiding passage in close proximity to said slotted surface in the direction of signal wave propagation at an average velocity $v_e$, the quantities $v$, $d$, and $v_e$ being related substantially by the expression $$\omega d\left(1-\frac{v_e}{v}\right)=2\pi n v_e$$

where $\omega$ is a mid-band radian signal frequency and $n$ is a positive integer, and the ratio of slot width in the longitudinal direction to the distance $d$ being substantially three-tenths.

4. A broad-band microwave amplifier which comprises an elongated conductively bounded electromagnetic wave guiding band-pass filter structure characterized by a mid-band operating phase velocity of wave transmission $v$ and having at least one transversely slotted inner surface, whereby said passage comprises enlarged and constricted wave guiding passage portions in alternation, the slots having substantially constant width and spacing in the longitudinal direction and the centers of adjacent slots being separated in the longitudinal direction by a distance $d$, means to supply signal wave energy within a predetermined frequency band to an input end of said filter structure, means to withdraw amplified signal wave energy from an output end of said filter structure, and means including an electron gun adjacent the input end of said filter structure to direct a stream of electrons longitudinally through said filter structure in close proximity to said slotted surface in the direction of signal wave propagation at an average velocity $v_e$, the quantities $v$, $d$, and $v_e$ being related substantially by the expression $$\omega d\left(1-\frac{v_e}{v}\right)=2\pi n v_e$$

where $\omega$ is a mid-band radian signal frequency and $n$ is a positive integer, and the ratio of slot width in the longitudinal direction to the distance $d$ being at most three-tenths.

5. A microwave amplifier in accordance with claim 4 in which $n$ is unity and the ratio of slot width in the longitudinal direction to the distance $d$ is substantially three-tenths.

6. A microwave amplifier in accordance with claim 4 in which at least one longitudinal electron-carrying slot extends lengthwise of said slotted surface in longitudinal alignment with said electron gun, crossing the faces of said transverse slots substantially at right angles, to increase the space in which gain-producing interaction between the signal waves and the electron stream can take place.

7. A microwave amplifier in accordance with claim 4 which includes a conductive barrier across the input end of said filter structure apertured to permit electrons to pass.

8. A broad-band microwave amplifier which comprises an elongated conductively bounded electromagnetic wave guiding passage of substantially rectangular cross section characterized by a mid-band operating phase velocity of wave transmission $v$ and having at least one transversely corrugated inner surface formed by a multiplicity of regularly spaced parallel transverse rectangular conducting fins extending substantially perpendicularly from an inner surface of said passage in an array extending longitudinally thereof, the corrugations of said surface forming a succession of substantially uniform parallel slots and ribs in alternation, whereby said passage comprises enlarged and constricted wave guiding passage portions in alternation, said slots being of substantially constant width and spacing in the longitudinal direction and the centers of adjacent slots being separated in the longitudinal direction by the distance $d$, means to supply signal wave energy within a predetermined frequency band to one end of said wave guiding passage, means to withdraw amplified signal wave energy from the other end of said wave guiding passage, and means including an electron gun to direct a stream of electrons longitudinally through said wave guiding passage in close proximity to the edges of said fins most remote from said inner surface of said wave guiding passage in the direction of signal wave propagation at an average velocity $v_e$, the quantities $v$, $d$, and $v_e$ being related substantially by the expression $$\omega d\left(1-\frac{v_e}{v}\right)=2\pi n v_e$$

where $\omega$ is a mid-band radian signal frequency and $n$ is a positive integer, and the ratio of slot width in the longitudinal direction to the distance $d$ being at most three-tenths.

9. A microwave amplifier in accordance with claim 8 in which $n$ is unity and the ratio of the distance in the longitudinal direction between successive fins to the distance $d$ is substantially three-tenths.

10. A microwave amplifier in accordance with claim 8 in which at least one longitudinal electron-carrying slot extends lengthwise of said wave guiding passage in said transverse fins in longitudinal alignment with said electron gun, crossing said edges of said fins substantially at right angles, to increase the space in which gain-producing interaction between the signal waves and the electron stream can take place.

11. A broad-band microwave amplifier which comprises an elongated conductively bounded electromagnetic wave guiding passage characterized by a mid-band operating phase velocity of wave transmission $v$ and having a multiplicity of regularly spaced parallel transverse rod-like conducting elements extending substantially vertically between two inner surfaces thereof in an array extending longitudinally of said wave guiding passage, the centers of adjacent rod-like elements being separated in the longitudinal direction by a distance $d$, means to supply signal wave energy within a predetermined frequency band to one end of said wave guiding passage, means to withdraw amplified signal wave energy from the other end of said wave guiding passage, and means including an electron gun to direct a stream of electrons longitudinally through said wave guiding passage in the direction of signal wave propagation at an average velocity $v_e$ in close proximity to said rod-like elements, the quantities $v$, $d$, and $v_e$ being related substantially by the expression $$\omega d\left(1-\frac{v_e}{v}\right)=2\pi n v_e$$

where $\omega$ is a mid-band radian signal frequency and $n$ is an integer.

12. A microwave amplifier in accordance with claim 11 in which $n$ is unity and the ratio of the distance in the longitudinal direction between successive rod-like elements to the distance $d$ is substantially three-tenths.

13. A microwave amplifier which comprises an elongated conductivity bounded electromagnetic wave guiding band-pass filter structure having at least one transversely corrugated inner surface, means to supply signal wave energy to an input end of said filter structure, means to withdraw amplified signal wave energy from an output end of said filter structure, means including an electron gun to direct a stream of electrons longitudinally through said filter structure in close proximity to said corrugated surface in the direction of signal wave propagation, and a conductive barrier across the input end of said filter structure apertured to permit electrons to pass.

14. A microwave amplifier which comprises an elongated conductively bounded electromagnetic wave guiding band-pass filter structure having at least one transversely corrugated inner surface, means to supply signal wave energy to an input end of said filter structure, means to withdraw amplified signal wave energy from an output end of said filter structure, and means including an electron gun to direct a stream of electrons longitudinally through said filter structure in close proximity to said corrugated surface in the direction of signal wave propagation, said corrugated surface having at least one electron-carrying slot extending lengthwise of said filter structure in longitudinal alignment with said electron gun, crossing the transverse corrugations, to increase the space in which gain-producing interaction between the signal waves and the electron stream can take place.

15. A microwave amplifier which comprises an elongated conductively bounded electromagnetic wave guiding band-pass filter structure having at least one transversely corrugated inner surface, means to supply signal wave energy to an input end of said filter structure, means to withdraw amplified signal wave energy from an output end of said filter structure, and means including an electron gun to direct a stream of electrons longitudinally through said filter structure in close proximity to said corrugated surface in the direction of signal wave propagation, said corrugated surface having a plurality of electron-carrying slots extending lengthwise of said filter structure in longitudinal alignment with said electron gun, crossing the transverse corrugations, to increase the space in which gain-producing interaction between the signal waves and the electron stream can take place.

16. A microwave device which comprises a conductively bounded band-pass filter structure forming an elongated electromagnetic wave guiding path and having at least one transversely corrugated inner surface, means to transmit electromagnetic wave energy lengthwise through said filter structure, and means including an electron-emissive source to direct electrons lengthwise of and within said filter structure along a predetermined path, said corrugated surface having at least one electron-carrying slot extending lengthwise of said filter structure, crossing the transverse corrugations and positioned to encompass at least a portion of said electron path, to increase the space in which interaction between electromagnetic waves and electrons can take place.

References Cited in the file of this patent

UNITED STATES PATENTS

| Number | Name | Date |
|---|---|---|
| 2,300,052 | Lindenblad | Oct. 27, 1942 |
| 2,487,656 | Kilgore | Nov. 8, 1949 |
| 2,511,407 | Kleen et al. | June 13, 1950 |

FOREIGN PATENTS

| Number | Country | Date |
|---|---|---|
| 934,220 | France | Jan. 7, 1949 |

OTHER REFERENCES

Article by Doehler, Kleen and Palluel pp. 1–8, Extract from the Annales de Radioelectricite, vol. 4, No. 15, Jan. 1949.

Article by Warnecke and Guenard, pp. 272–278, inclusive, "Annales de Radioelectricite," vol. 3, No. 14, Oct. 1948.